United States Patent
Ren et al.

(10) Patent No.: US 10,741,837 B2
(45) Date of Patent: Aug. 11, 2020

(54) NICKEL-BASED POSITIVE ELECTROACTIVE MATERIALS

(71) Applicant: Lionano Inc., Woburn, MA (US)

(72) Inventors: Dong Ren, Woburn, MA (US); Yun Shen, Woburn, MA (US); Yingchao Yu, Woburn, MA (US)

(73) Assignee: Lionano Inc., Woburn, MA (US)

(*) Notice: Subject to any disclaimer, the term of this patent is extended or adjusted under 35 U.S.C. 154(b) by 93 days.

(21) Appl. No.: 15/270,767

(22) Filed: Sep. 20, 2016

(65) Prior Publication Data

US 2017/0092948 A1 Mar. 30, 2017

Related U.S. Application Data (60) Provisional application No. 62/232,753, filed on Sep. 25, 2015.

(30) Foreign Application Priority Data

Jan. 14, 2016 (CN) .......................... 2016 1 0020790

(51) Int. Cl.
*H01M 4/131* (2010.01)
*H01M 4/505* (2010.01)
(Continued)

(52) U.S. Cl.
CPC ............ *H01M 4/505* (2013.01); *C01G 53/50* (2013.01); *H01M 4/525* (2013.01);
(Continued)

(58) Field of Classification Search
CPC .. H01M 4/505; H01M 10/0525; H01M 4/525; H01M 2004/021; H01M 2004/028;
(Continued)

(56) References Cited

U.S. PATENT DOCUMENTS

2006/0204851 A1 9/2006 Lee et al.
2010/0086852 A1* 4/2010 Gibot ...................... C01B 25/45
429/221
(Continued)

FOREIGN PATENT DOCUMENTS

CN 102931391 A 2/2013
CN 103285016 A 5/2014
(Continued)

OTHER PUBLICATIONS

Sun, Yang-Kook, et al. "A Novel Cathode Material with a Concentration-Gradient for High-Energy and Safe Lithium-Ion Batteries." *Adv. Funct. Mater.* (2010):20(3), pp. 485-491.
(Continued)

*Primary Examiner* — Cynthia K Walls
(74) *Attorney, Agent, or Firm* — Wolf, Greenfield & Sacks, P.C.

(57) ABSTRACT

A positive electroactive material for a lithium-ion battery can have a tap density ranging from 2.50 to 2.90 g/cm³, a Span value ranging from 1.04 to 1.68 and/or a capacity ranging from 195 to 210 mAh/g obtained using a discharging current of C/5 current rate. The material can have a formula $Li_a[Ni_xMn_yCo_{1-x-y}]_zM_{1-z}O_2$, wherein a is between approximately 1.02 and 1.07, x is between approximately 0.60 to 0.82, y is between approximately 0.09 to 0.20, z is between approximately 0.95 to 1.0, and 1−x−y is greater than 0. A cost-effective and large-scale synthetic method for preparing the positive electroactive material, an electrochemical cell containing the positive electroactive material, and a battery comprising one or more lithium ion electrochemical cells are also described.

20 Claims, 8 Drawing Sheets (51) Int. Cl.
*H01M 4/525* (2010.01)
*H01M 10/0525* (2010.01)
*C01G 53/00* (2006.01)
*H01M 4/02* (2006.01)

(52) U.S. Cl.
CPC ..... *H01M 10/0525* (2013.01); *C01P 2002/20* (2013.01); *C01P 2002/72* (2013.01); *C01P 2004/03* (2013.01); *C01P 2004/32* (2013.01); *C01P 2004/51* (2013.01); *C01P 2004/61* (2013.01); *C01P 2006/11* (2013.01); *C01P 2006/40* (2013.01); *H01M 2004/021* (2013.01); *H01M 2004/028* (2013.01); *Y02T 10/7011* (2013.01)

(58) Field of Classification Search
CPC .. C01G 53/50; C01P 2004/61; C01P 2006/40; C01P 2006/11; C01P 2002/20; C01P 2004/51; C01P 2004/32; C01P 2004/03; C01P 2002/72
See application file for complete search history.

(56) References Cited

U.S. PATENT DOCUMENTS

| | | | |
|---|---|---|---|
| 2010/0112447 A1* | 5/2010 | Yamamoto | H01M 4/131 429/223 |
| 2013/0183585 A1 | 7/2013 | Sun et al. | |
| 2017/0069907 A1* | 3/2017 | Zhu | H01M 4/0435 429/233 |

FOREIGN PATENT DOCUMENTS

| | | |
|---|---|---|
| CN | 103825016 A | 5/2014 |
| WO | WO-2007094644 A1 | 8/2007 |
| WO | WO 2015/132647 * | 9/2015 |
| WO | WO 2015/132647 A1 | 9/2015 |
| WO | WO 2017/053275 A1 | 3/2017 |

OTHER PUBLICATIONS

International Search Report and Written Opinion for PCT/US2016/052627 dated Sep. 12, 2016.
International Preliminary Report on Patentability for Application No. PCT/US2016/052627 dated Apr. 5, 2018.
Chinese Office Action for Application No. CN201680054919.6 dated Aug. 9, 2018.
Chinese Office Action for Application No. CN201680054919.6 dated Sep. 29, 2018.
Notification of First Examination Opinion for Application No. CN 201610020790.9 dated May 16, 2018.
Notice of Reasons for Rejection for Application No. KR 10-2018-7011215 dated Nov. 9, 2018.
Korean Office Action for Application No. KR 10-2018-7011215 dated Mar. 22, 2019.
Second Office Action for Application No. CN 201610020790.9 dated Feb. 11, 2019.
Third Office Action for Application No. CN 201610020790.9 dated May 13, 2019.
Notification to Grant Patent Right for Invention for Application No. CN 201610020790.9 dated Aug. 6, 2019.
Notice of Rejection for Application No. CN 201680054919.6 dated Dec. 6, 2018.
Intention to Grant for Application No. EP 16774602.3 dated Jul. 5, 2019.
Decision to Grant a European Patent for Application No. EP 16774602.3 dated Oct. 10, 2019.
Korean Office Action for Application No. 10-2019-7023678 dated Jan. 9, 2020.

* cited by examiner

Preparation Materials and Measurements for Samples 1-13

| Sample | NiSO$_4$-6H$_2$O (g) | MnSO$_4$-H$_2$O (g) | CoSO$_4$-7H$_2$O (g) | M Salt (g) | Ni (%) | Mn (%) | Co (%) | M (%) | Molar Ratio of Li/(Ni+Mn+Co+M) | Calcination temp(°C) | Calcination time(h) | Tap density (g/cm$_3$) | Span | Discharge capacity (mAh/g, 0.2C) | Capacity Retention after 100 cycles(%, 0.5C) |
|---|---|---|---|---|---|---|---|---|---|---|---|---|---|---|---|
| 1 | 325.93 | 67.61 | 101.20 | None | 62 | 20 | 18 | 0 | 1.05 | 820 | 10 | 2.72 | 1.04 | 204 | 90 |
| 2 | 268.10 | 50.70 | 50.60 | None | 68 | 20 | 12 | 0 | 1.05 | 820 | 10 | 2.69 | 1.08 | 206 | 88 |
| 3 | 283.88 | 35.49 | 59.03 | None | 72 | 14 | 14 | 0 | 1.05 | 820 | 10 | 2.68 | 1.12 | 207 | 85 |
| 4 | 307.53 | 28.98 | 42.17 | None | 78 | 12 | 10 | 0 | 1.05 | 820 | 10 | 2.63 | 1.13 | 210 | 81 |
| 5 | 244.45 | 50.70 | 75.90 | None | 62 | 20 | 18 | 0 | 1.02 | 820 | 10 | 2.70 | 1.20 | 195 | 80 |
| 6 | 244.45 | 50.70 | 75.90 | None | 62 | 20 | 18 | 0 | 1.07 | 820 | 10 | 2.68 | 1.36 | 201 | 81 |
| 7 | 178.74 | 33.80 | 33.73 | None | 68 | 20 | 12 | 0 | 1.05 | 860 | 10 | 2.61 | 1.44 | 206 | 90 |
| 8 | 178.74 | 33.80 | 33.73 | None | 68 | 20 | 12 | 0 | 1.05 | 900 | 10 | 2.50 | 1.68 | 197 | 84 |
| 9 | 244.45 | 50.70 | 75.90 | None | 62 | 20 | 18 | 0 | 1.05 | 820 | 12 | 2.67 | 1.43 | 201 | 85 |
| 10 | 244.45 | 50.70 | 75.90 | None | 62 | 20 | 18 | 0 | 1.05 | 820 | 16 | 2.59 | 1.59 | 192 | 82 |
| 11 | 178.74 | 33.80 | 33.73 | La(NO$_3$)$_3$ 13.53 | 65.3 | 19.2 | 11.5 | 4 | 1.04 | 860 | 12 | 2.60 | 1.45 | 203 | 90 |
| 12 | 244.45 | 50.70 | 75.90 | SmBr$_3$ 5.91 | 61.4 | 19.8 | 17.8 | 1 | 1.03 | 820 | 12 | 2.69 | 1.23 | 197 | 83 |
| 13 | 178.74 | 33.80 | 33.73 | Al$_2$(SO$_4$)$_3$ 14.25 | 65.3 | 19.2 | 11.5 | 4 | 1.04 | 860 | 12 | 2.58 | 1.46 | 186 | 78 |

NICKEL-BASED POSITIVE ELECTROACTIVE MATERIALS

CROSS-REFERENCE TO RELATED APPLICATION

The current application is claims priority to U.S. Provisional patent application Ser. No. 62/232,753, filed on Sep. 25, 2015 and entitled "A High Performance Nickel-Based Positive Electroactive Material for a Lithium-Ion Battery," and also to Chinese Patent Application No. 201610020790.9, filed on Jan. 14, 2016, both of which are incorporated by reference herein in its entirety.

TECHNICAL FIELD

The subject matter described herein relates generally to battery technology. Various implementations relate specifically to lithium ion batteries and more specifically to positive electro-active materials for use in lithium-ion battery systems.

BACKGROUND

Improvements in currently available lithium-ion battery systems (e.g. with regard to energy density, safety, and cost) can improve the suitability of these technologies for use in electric vehicle applications. Typically, a lithium ion battery is composed of a negative electroactive material, a positive electroactive material, an electrolyte, and a separator. In current technology, the working voltage, capacity, and rate capability of lithium-ion batteries are mainly determined by the limited capacity and thermodynamics of the positive electroactive material. Consequently, the development of superior positive electroactive materials is desirable, particularly for demanding electric vehicle applications.

Currently, there are four main types of positive electroactive materials for electric vehicle applications: lithium nickel cobalt oxide, lithium iron phosphate, lithium manganese oxide and lithium nickel manganese cobalt oxide. The characteristics of each material present different advantages and disadvantages to their industrial applications: lithium nickel cobalt aluminum oxide positive electroactive materials can deliver high capacity but generally suffer from significant safety problems; lithium iron phosphate positive electroactive materials are safer and generally offer a long cycle life, but have the lowest energy density; and lithium manganese oxide positive electroactive materials offer high thermal stability but have relatively low capacity and suffer from manganese dissolution. Since the capacity and rate performance of current positive electroactive materials cannot meet the demands of the emerging electric vehicle market, it would be desirable to develop a high-performance positive electroactive material with a high capacity and superior rate capability.

SUMMARY

In various aspects, the current subject matter can provide positive electroactive materials that include a lithium nickel manganese cobalt oxide compound having a higher tap density and a lower Span than previously available positive electroactive materials. One or more features of the current subject matter may allow for a greater quantity of the subject material to be stored inside a battery, which can result in an increase in the energy density of the battery.

In one aspect, a positive electroactive material has a positive electroactive composition that includes Lithium (Li), Nickel (Ni), Manganese (Mn), and Cobalt (Co). The positive electroactive material has a tap density in a tap density range of approximately 2.50 to 2.90 g/cm$^3$.

In an optional variation, the positive electroactive material can be formed into a plurality of closely packed particles, and the plurality of closely packed particles can be characterized by a particle size distribution having a Span in a Span range of from about 1.04 to about 1.68.

In another interrelated aspect, a positive electroactive material includes Lithium (Li), Nickel (Ni), Manganese (Mn), and Cobalt (Co). The Li, Ni, Mb, and Co are part of a positive electroactive composition formed into a plurality of closely packed particles. The plurality of closely packed particles is characterized by a particle size distribution having a Span in a Span range of from about 1.04 to about 1.68.

In optional variations, one or more of the following features can be included in any feasible combination. The plurality of closely packed particles can include particles with a particle diameter range between approximately 10 and 14 μm. The positive electroactive material can have a layered structure and a well-defined spherical structure. The positive electroactive material can further include an element M selected from Samarium (Sm), Silicon (Si), Lanthanum (La) or combinations thereof.

The positive electroactive composition can have a formula $Li_a[Ni_xMn_yCo_{1-x-y}]_zM_{1-z}O_2$, wherein a is a numerical value in a first range between approximately 1.02 and 1.07, x is a numerical value in a second range between approximately 0.60 to 0.82, y is a numerical value in a third range between approximately 0.09 to 0.20, z is a numerical value in a fourth range between approximately 0.95 to 1.0, and 1−x−y is greater than 0. The positive electroactive material can have a charge capacity ranging from about 192 to about 210 mAh/g using a discharging current of C/5 current rate. The first range can be approximately 1.04 to 1.05. In other variations, one or more of the following sets of parameters can apply. In one example, x can be 0.62, y can be 0.20, 1−x−y can be 0.18, z can be 1.0, the tap density range can be approximately 2.59 to 2.72 g/cm$^3$, the Span range can be approximately 1.04 to 1.59, and the capacity can range from 192 to 204 mAh/g using a discharging current of C/5 current rate. In another example, a can be 1.05, x can be 0.68, y can be 0.20, z can be 1.0, 1−x−y can be 0.12, the tap density range can be approximately 2.50 to 2.69 g/cm$^3$, the Span range can be approximately 1.08 to 1.68, and the capacity range can be approximately 197 to 206 mAh/g using the discharging current of C/5 current rate. In still another example, a can be 1.05, x can be 0.72, y can be 0.14, z can be 1.0, 1−x−y can be 0.14, the tap density can be 2.68 g/cm$^3$, the Span can be 1.12, and the capacity can be 207 mAh/g using the discharging current of C/5 current rate. In yet another example, a can be 1.05, x can be 0.78, y can be 0.12, z can be 1.0, 1−x−y can be 0.10, the tap density can be 2.63 g/cm$^3$, the Span can be 1.13, and the capacity can be 210 mAh/g using the discharging current of C/5 current rate.

In another interrelated aspect, a method for obtaining a positive electroactive as discussed above can include preparing a metal precursor comprising nickel, manganese, cobalt and M, mixing the metal precursor with a lithium source to form a lithium-metal precursor mixture, and calcining the lithium-metal precursor mixture at a temperature ranging from about 780° C. to about 920° C. for a period of from about 10 to about 16 hours.

In optional variations, the lithium source can be lithium carbonate or lithium hydroxide or a mixture thereof. The metal precursor can be mixed with the lithium source using a dry chemical process. The metal precursor can be mixed with the lithium source using a wet chemical process. The lithium-metal precursor mixture can be calcined at a temperature ranging from about 780° C. to about 920° C. The lithium-metal precursor mixture can be calcined for a period of about 10 to about 16 hours. The metal precursor can be prepared by a method that includes dissolving a nickel salt, a manganese salt, a cobalt salt and a M salt in a solvent to prepare a solution, and co-precipitating the metal precursor from the solution. The nickel salt can include nickel sulfate, nickel acetate, nickel chloride, or nickel nitrate, the manganese salt can include manganese sulfate, manganese acetate, manganese chloride, or manganese nitrate, the cobalt salt can include cobalt sulfate, cobalt acetate, cobalt chloride, or cobalt nitrate, and the M salts can include the relative chlorides, oxalates, sulfates, nitrates, and acetic acid salts. The solvent can include distilled water, methanol, ethanol or mixtures thereof. The co-precipitation can be carried out at a pH between about 10.6 to about 11.8. The co-precipitation can be carried out at a temperature of from about 45° C. to about 80° C.

In yet other interrelated aspects, a lithium ion electrochemical cell includes a lithium intercalation negative electroactive material, a suitable non-aqueous electrolyte and a separator, and the positive electroactive material of any of the previously described aspects and/or variations. A battery can include one or more lithium ion electrochemical cells, where each lithium ion electrochemical cell includes a lithium intercalation negative electroactive material, a suitable non-aqueous electrolyte and a separator, and a positive electroactive material of any of the above-described aspects or variations.

The details of one or more variations of the subject matter (including but not limited to systems, methods of use and making, compositions, and articles of manufacture consistent with these approaches) described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Among candidate positive electroactive materials, lithium nickel manganese cobalt oxide material generally offers a desirable balance of performance criteria, and is regarded as a promising candidate for future electric vehicle applications. Although it suffers from poor thermal stability, nickel is used in the lithium nickel manganese cobalt oxide material due to its high capacity. The function of the three transition metals is believed to be as follows: nickel provides superior capacity, manganese provides excellent thermal stability but low capacity, and cobalt provides increased electronic conductivity and structural stability. Since the capacity and rate performance of currently available positive electroactive materials cannot meet the demands of the emerging electric vehicle market, it is desirable to develop a high-performance nickel-based positive electroactive material having high capacity and superior discharge rate capability (e.g. capacity retention under high discharge rate). The desirable properties of lithium nickel manganese cobalt oxide materials consistent with implementations of the current subject matter may relate strongly to the ratios of the transition metal ions (e.g. nickel, manganese, and cobalt) in the material.

Positive electroactive materials consistent with implementations of the current subject matter can be represented by the formula $$Li_a[Ni_xMn_yCo_{1-x-y}]_zM_{1-z}O_2 \quad (1)$$

where M represents an element or a combination of elements selected from Samarium (Sm), Silicon (Si), and Lanthanum (La), and the values of a, x, y, and z are constrained as follows:

$$1.02 \leq a \leq 1.07 \quad (2)$$

$$0.60 \leq x \leq 0.82 \quad (3)$$

$$0.09 \leq y \leq 0.20 \quad (4)$$

$$0.95 \leq z \leq 1.0 \quad (5)$$

$$1-(x+y) > 0 \quad (6)$$

In other words, a is a numerical value in a first range from approximately 1.02 to 1.07 (inclusive), and the first range can advantageously be approximately 1.04 to 1.05; x is a numerical value in a second range from approximately 0.60 to 0.82; y is a numerical value in a third range from approximately 0.09 to 0.20; z is a numerical value in a fourth range from approximately 0.95 to 1.0, and the sum of x and y subtracted from 1 is greater than 0.

Examples of positive electroactive materials consistent with implementations of the current subject matter include, but are not limited to, those with the values of a, x, y, and z listed in Table 1.

TABLE 1

Examples of positive electroactive materials.

| Example | a | x | y | z | Formula |
|---|---|---|---|---|---|
| 1 | 1.02 | 0.62 | 0.20 | 1.0 | $Li_{1.02}[Ni_{0.62}Mn_{0.20}Co_{0.18}]O_2$ |
| 2 | 1.05 | 0.62 | 0.20 | 0.96 | $Li_{1.05}[Ni_{0.62}Mn_{0.20}Co_{0.18}]_{0.96}M_{0.04}O_2$ |
| 3 | 1.05 | 0.72 | 0.14 | 0.98 | $Li_{1.05}[Ni_{0.72}Mn_{0.14}Co_{0.14}]_{0.98}M_{0.02}O_2$ |
| 4 | 1.05 | 0.78 | 0.12 | 0.99 | $Li_{1.05}[Ni_{0.78}Mn_{0.12}Co_{0.10}]_{0.99}M_{0.01}O_2$ |
| 5 | 1.07 | 0.62 | 0.20 | 1.0 | $Li_{1.07}[Ni_{0.62}Mn_{0.20}Co_{0.18}]_{o2}$ |

Positive electroactive materials consistent with implementations of the current subject matter can have a well-defined spherical morphology. For example, the particles in the crystal structure of the positive electroactive material may advantageously be uniformly or nearly uniformly spherical. Particles of a highly spherical shape can generally have a higher tap density, which is anticipated to improve the performance of the positive electroactive material in a battery. A greater tap density can allow a larger quantity of positive electroactive material to be stored in a battery's limited volume, thereby resulting in a higher volumetric capacity and therefore improved volumetric energy density. Positive electroactive materials consistent with implementations of the current subject matter can advantageously have tap densities in a tap density range of 2.50 to 2.90 $g/cm^3$. In contrast, previously available materials, such as for example those described by Sun, et al. (see, e.g., *Advanced Function Materials,* 20(3), 2010, 485), the tap densities are 1.7 $g/cm^3$ for the concentration gradient structure material and 2.3 $g/cm^3$ for the core material.

Figure 1:
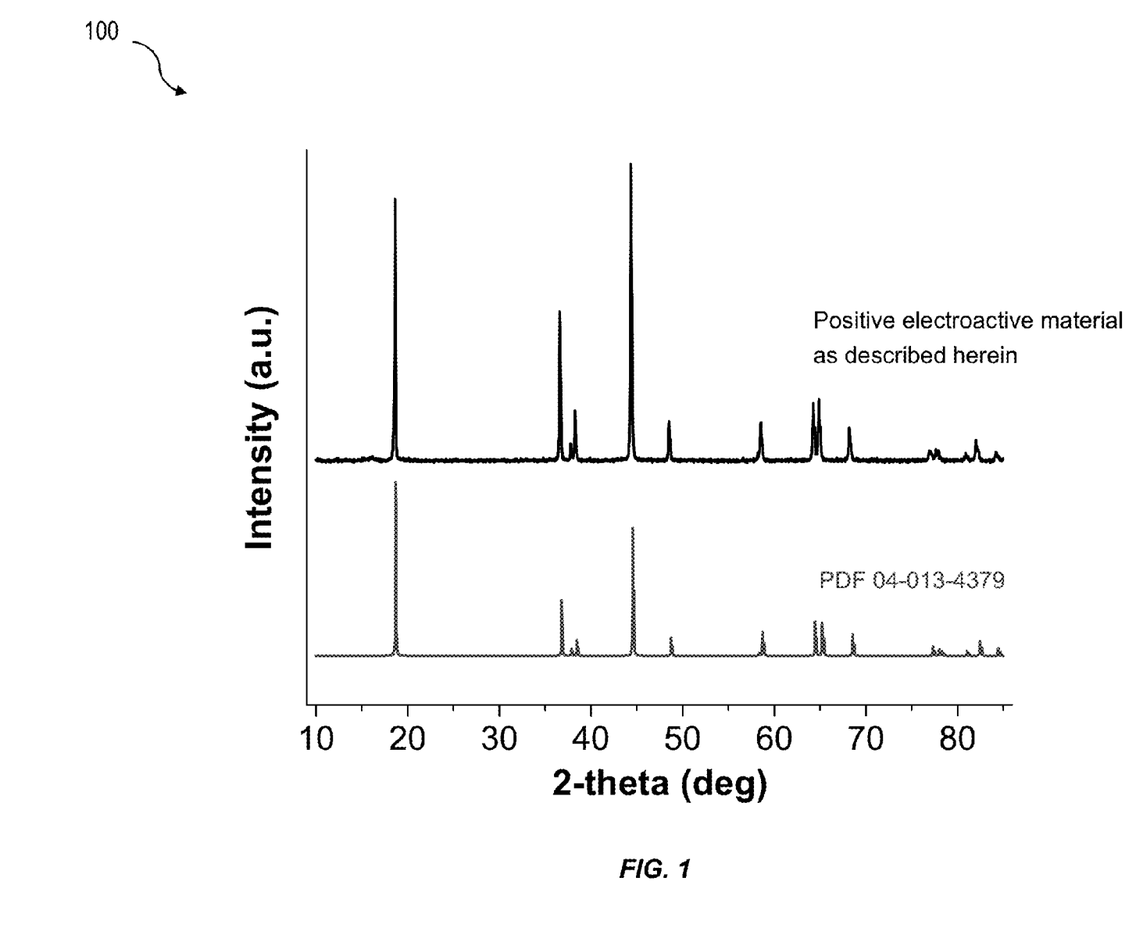
FIG. 1 shows a chart illustrating an X-ray diffraction pattern of a positive electroactive material consistent with implementations of the current subject matter.

Positive electroactive materials consistent with certain implementations of the current subject matter can advantageously have a layered crystal structure as shown in the powder x-ray diffraction pattern shown in the chart 100 of FIG. 1. This pattern is consistent with the International Centre for Diffraction Data's powder diffraction file (PDF) 04-013-4379, which represents a standard lithium manganese nickel cobalt oxide material.

The typical particle size distribution, expressed in Span, is defined as follows:

$$Span = (D90 - D10)/D50 \quad (7)$$

where D50 indicates a particle diameter that is larger than fifty (50) percent of the total number of particles (i.e. the median particle diameter), while D90 and D10 respectively stand for particle diameters that are larger than ninety (90) and ten (10) percent of the total number of particles. Consistent with implementations of the current subject matter, a positive electroactive material can have a particle size distribution characterized by a Span value in a Span range between about 1.04 and about 1.68, while commercial materials usually have a span over 2.0. This higher span shows that the commercial materials are non-uniform and have relatively broad size distribution.

Consistent with certain implementations of the current subject matter, a positive electroactive material may have a charge capacity in a charge capacity range from about 192 to about 210 mAh/g using a discharging current of C/5 current rate (e.g. the 5-hour discharge rate).

Figure 2:
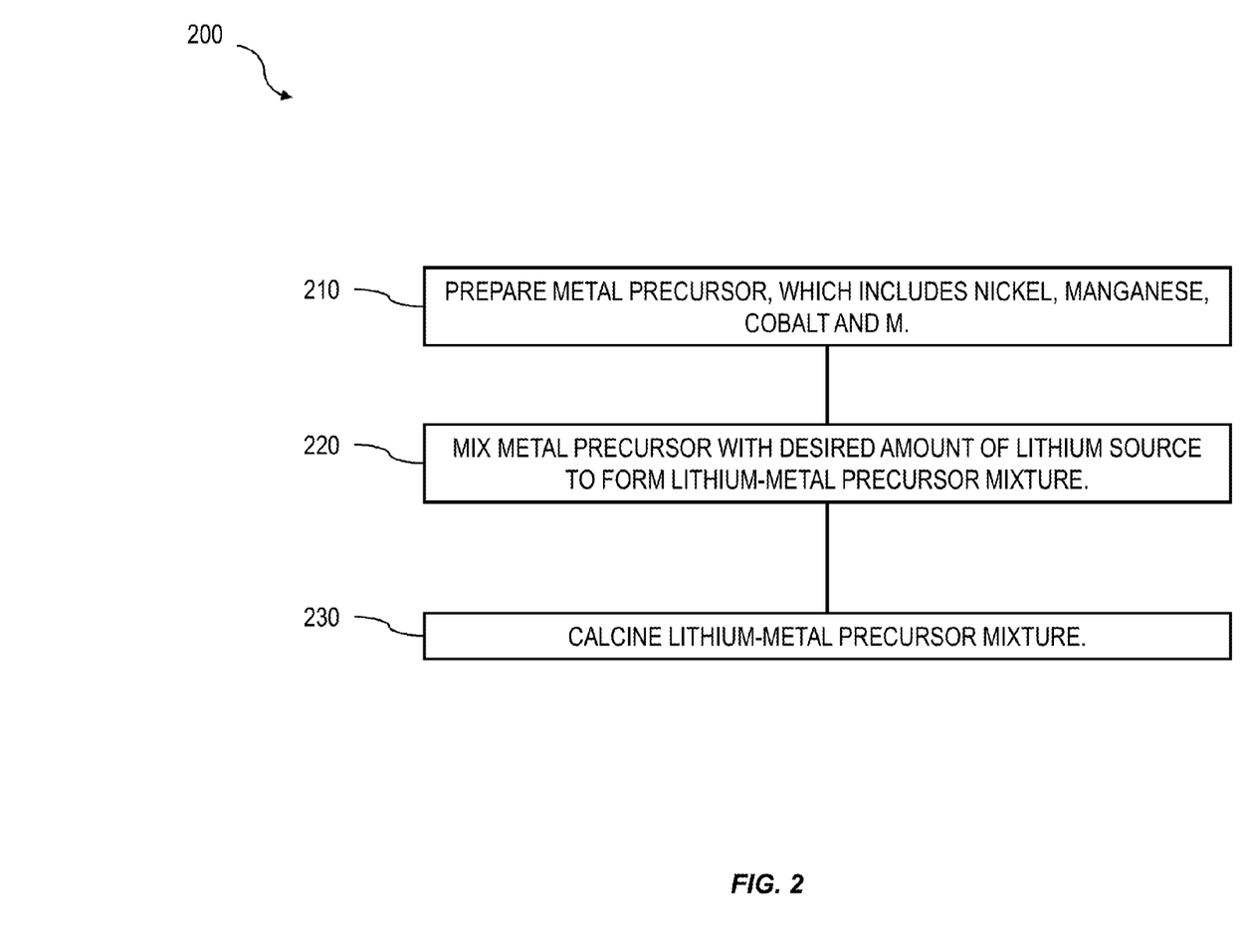
FIG. 2 shows a process flow chart illustrating features of a method consistent with implementations of the current subject matter.

Certain positive electroactive materials such as those described herein may be synthesized by any method known to one skilled in the art. Advantageously, a positive electroactive material consistent with implementations of the current subject matter may be synthesized by a method including one or more of the features summarized in the process flow chart 200 of FIG. 2. As shown in FIG. 2, a metal precursor, which includes nickel, manganese, cobalt and M (e.g. a dopant metal that can be one or more of Sm, Si, and La as discussed above) is prepared at 210. At 220, the metal precursor is mixed with a desired amount of a lithium source to form a lithium-metal precursor mixture. At 230, the lithium-metal precursor mixture is calcined at an elevated temperature for a desired amount of time to obtain the positive electroactive material.

The lithium-metal precursor mixture may be calcined at a temperature in the range of from about 780° C. to about 920° C. in an oxygen-rich atmosphere. The calcination time is preferably from about 10 hours to about 16 hours. Alternatively, the mixture may be calcined until a layered structure of the positive electroactive material is formed. The synthetic method is a simple one that can be executed on a large scale.

Figure 3:
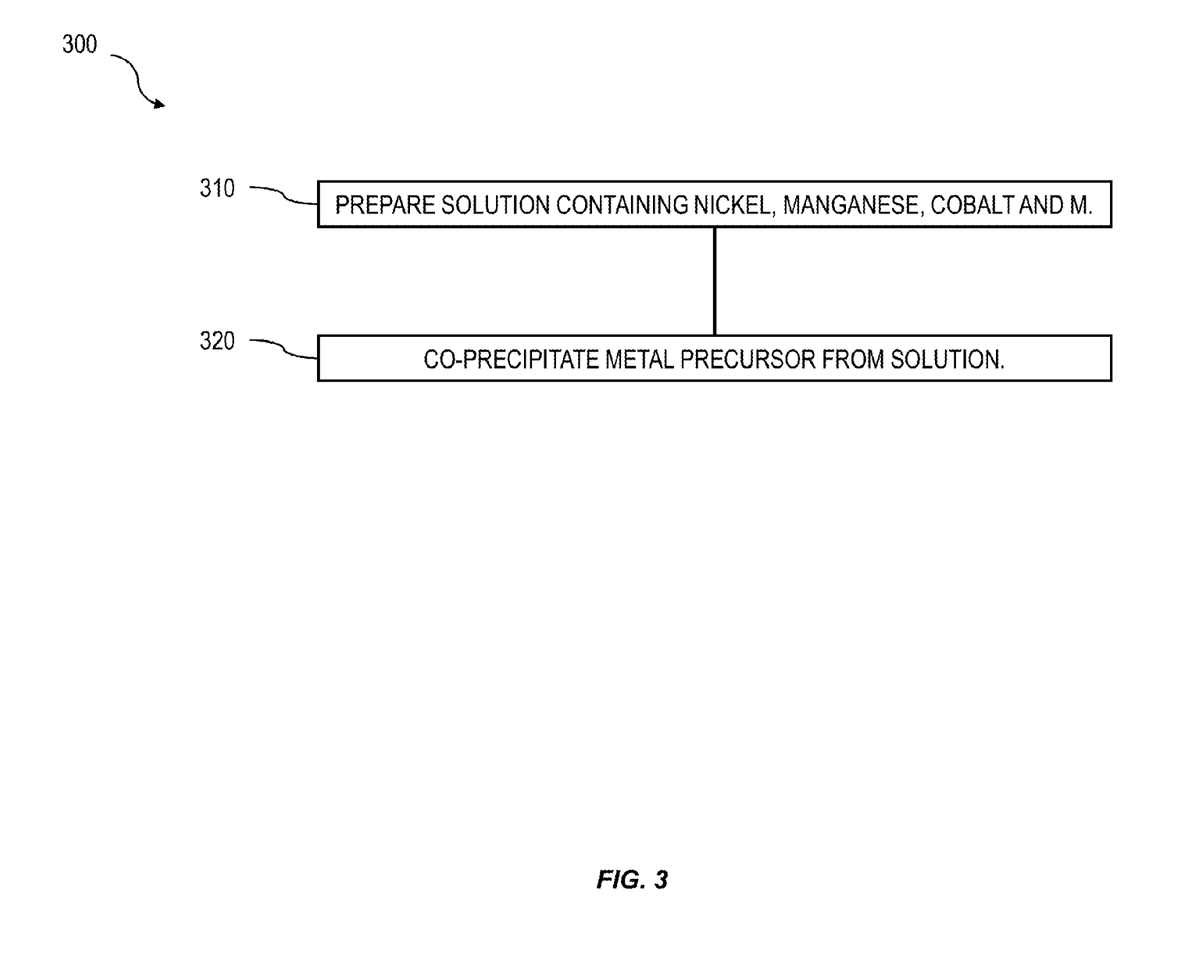
FIG. 3 shows a process flow chart illustrating features of another method consistent with implementations of the current subject matter.

The metal precursor that includes nickel, manganese, cobalt and M used at 210 in the process summarized and described in reference to the flow chart 200 of FIG. 2 may be prepared by mixing nickel, manganese and cobalt, e.g., by mixing salts of nickel, manganese and cobalt. In one example, this metal precursor may be prepared by a process including one or more features similar to those summarized in the process flow chart 300 of FIG. 3. As shown in FIG. 3, a solution containing nickel, manganese, cobalt and M can be prepared at 310, and the the metal precursor can be co-precipitated from the solution at 320.

The solution prepared at 310 may be prepared by dissolving salts of nickel, manganese, cobalt and M in a solvent. The co-precipitation at 320 may be carried out at a pH of from about 10.6 to about 11.8 and at a temperature ranging from about 45° C. to about 80° C., preferably from about 50° C. to about 65° C.

In certain implementations of the current subject matter, the solution prepared at 310 may be pumped into a reactor under a nitrogen atmosphere. Concurrently, a desired amount of sodium hydroxide (or other reagent that functions to maintain the desired pH) and ammonia hydroxide may be pumped into the reactor while maintaining a pH ranging from about 10.6 to about 11.8, and a temperature ranging from about 45° C. to about 80° C., advantageously from about 50° C. to about 65° C.

A positive electroactive material of the present application may be prepared using lithium sources such as lithium hydroxide (LiOH or $LiOH \cdot H_2O$), lithium carbonate ($Li_2CO_3$); nickel salts such as nickel sulfate ($NiSO_4$ or $NiSO_4 \cdot 6H_2O$), nickel acetate ($Ni(CH_3COO)_2$), nickel chloride ($NiCl_2$), or nickel nitrate ($Ni(NO_3)_2$ or $Ni(NO_3)_2 \cdot 6H_2O$)); manganese salts such as manganese sulfate ($MnSO_4$ or $MnSO_4 \cdot H_2O$), manganese acetate ($Mn(CH_3COO)_2$), manganese chloride ($MnCl_2$), or manganese nitrate ($Mn(NO_3)_2$ or $Mn(NO_3)_2 \cdot 4H_2O$); and cobalt salts such as cobalt sulfate ($CoSO_4$ or $CoSO_4 \cdot 7H_2O$), cobalt acetate ($Co(CH_3COO)_2$), cobalt chloride ($CoCl_2$), or cobalt nitrate ($Co(NO_3)_2$ or $Co(NO_3)_2 \cdot 6H_2O$). Soluble salts of the "M" elements (e.g. Sm, Si, and/or La) usable with the current subject matter can include one or more of the relative chlorides, oxalates, sulfates, nitrates, and acetic acid salts.

The amounts of the lithium source and the salts of nickel, manganese, and cobalt to be used can depend upon the chemical formula of the desired positive electroactive material. The quantity can desirably be compensated for waste occurring during the reaction. The solvent used to prepare the solution may be distilled water, methanol, ethanol or mixtures thereof, or the like.

The calcination temperature and duration are selected according to the electrochemical performance of the materials prepared under different temperatures and times. For example, the lithium-metal precursor mixture may be calcined at a temperature ranging from about 780° C. to about 920° C. for a period of time ranging from about 10 to about 16 hours. Alternatively, one may observe the peaks in an x-ray powder diffraction pattern of the positive electroactive material to determine whether a layered structure has formed in order to determine the calcination time needed to prepare the material.

This synthetic method is simple, cost-effective and may be conducted on a large scale. The method produces particles that are more spherical, have better electrochemical performance and a higher tap density than those achievable from previously available approaches.

A positive electroactive material consistent with implementations of the current subject matter may be used in an electrochemical cell. For example, a lithium ion electrochemical cell may be prepared using (i) a lithium intercalation negative electroactive material, (ii) a cathode comprising the positive electroactive material, (iii) a suitable non-aqueous electrolyte, and (iv) a separator between the negative electroactive material and the positive electroactive material.

Figure 4:
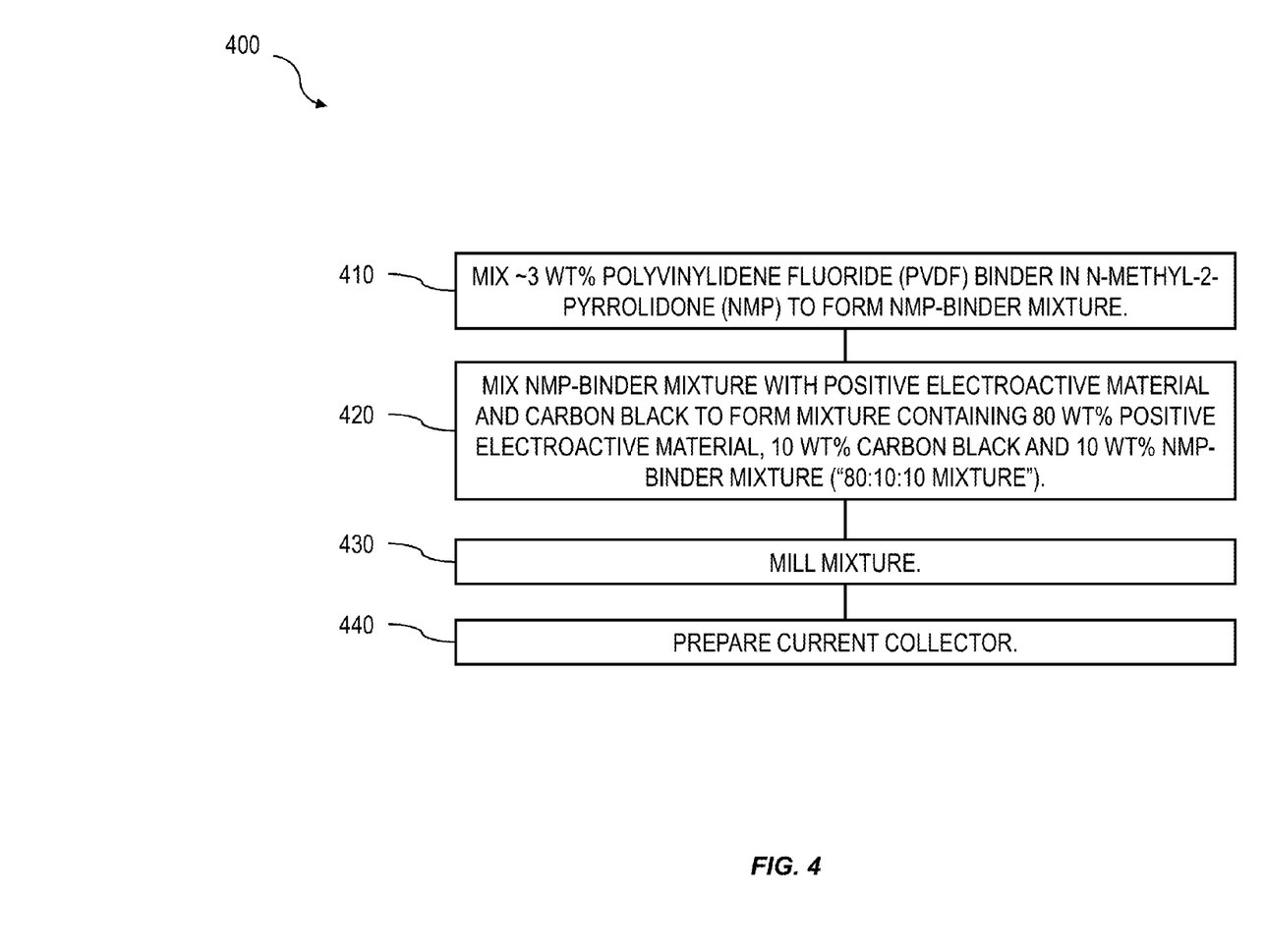
FIG. 4 shows a process flow chart illustrating features of yet another method consistent with implementations of the current subject matter.

The cathode of such an electrochemical cell may be prepared consistent with implementations of the current subject matter by various methods, such as for example a process having features similar to those summarized in the process flow chart 400 of FIG. 4, in which an approximately ~3 wt % polyvinylidene fluoride (PVDF) binder is mixed in N-methyl-2-pyrrolidone (NMP) to form an NMP-binder mixture at 410. At 420, the NMP-binder mixture is mixed with the positive electroactive material and carbon black to form a mixture containing 80 wt % positive electroactive material, 10 wt % carbon black and 10 wt % NMP-binder mixture ("the 80:10:10 mixture"). The 80:10:10 mixture is transferred into a ball mill, and at 430 the mixture is milled, for example at 800 rpm for 30 min with ten 5 mm diameter zirconia balls to form a slurry. In this example, the zirconia balls function as a medium for more effective mixing. It will be understood that other media can be used to promote efficient mixing. At 440, current collector is prepared, for example by spreading aluminum foil onto a glass plate and spraying acetone to ensure that there are no air bubbles between the foil and the glass plate. The slurry is applied onto the aluminum foil and spread uniformly on to the foil (e.g. using a razor blade or other spreading tool or feature) to form a coating film. The coating can be dried in a vacuum at 110° C. for 12 hours to form the positive electroactive material.

Examples of lithium intercalation negative electroactive materials that may be used in the lithium-ion electrochemical cell are graphite and lithium foil. An advantageous lithium intercalation negative electroactive material is lithium foil. Examples of suitable non-aqueous electrolytes are 1 mol/L lithium hexafluorophosphate ($LiPF_6$) in ethylene carbonate (EC) and dimethyl carbonate (DMC), 1 mol/L lithium hexafluorophosphate ($LiPF_6$) in ethylene carbonate (EC) and diethyl carbonate (DEC), and 1 mol/L Lithium hexafluorophosphate ($LiPF_6$) in ethylene carbonate (EC) and ethyl methyl carbonate (EMC). An advantageous non-aqueous electrolyte is 1 mol/L $LiPF_6$ in EC and EMC). Examples of separators are the Celgard 2400, 2500, 2340, and 2320 models. An advantageous separator is the Celgard 2320.

Nickel-based positive electroactive materials consistent with implementations of the current subject matter are high performance lithium nickel manganese cobalt oxide positive electroactive materials having superior capacity, rate capability and cyclability for use in a lithium-ion battery.

The lithium ion electrochemical cells of the current subject matter may also be connected to form a lithium-ion battery comprising one or more of the lithium ion electrochemical cells of the present invention, wherein each lithium ion electrochemical cell comprises (i) a lithium intercalation negative electroactive material; (ii) a suitable non-aqueous electrolyte and a separator; and (iii) the positive electroactive material of the present invention.

Without being bound to any particular theory, it is believed that the positive electroactive material of the present invention provides superior capacity because of the ratio of the transition metals nickel, manganese and cobalt in the material, the percentage of nickel in the material and/or because the precipitation method for preparing the material allows more precise control over the morphology of the material.

EXAMPLES

The following examples are presented for the purpose of further describing and explaining various aspects and illustrating features of implementations within the scope of the current subject matter and are not intended to limiting.

Preparation of samples. Thirteen (13) samples of positive electroactive materials were prepared as follows described below. In the amounts listed in the Table 500 of FIG. 5 for each sample, $NiSO_4.6H_2O$, $MnSO_4.H_2O$, $CoSO_4.7H_2O$ and M salt were dissolved in distilled water to form a 2 mol/L mixed metal sulfate solution. The mixed metal sulfate solution was then slowly pumped into a reactor under nitrogen atmosphere at a temperature of 55° C. Concurrently, a 23% NaOH solution and a 18% $NH_4OH$ solution were separately pumped into the reactor and a metal complex hydroxide was precipitated. The pH was kept constant at 11.0 before and after the solution being pumped into the reactor. The concentration of the solution, pH, temperature, and stirring speed of the reaction mixture were carefully monitored and controlled during the process.

Figure 5:
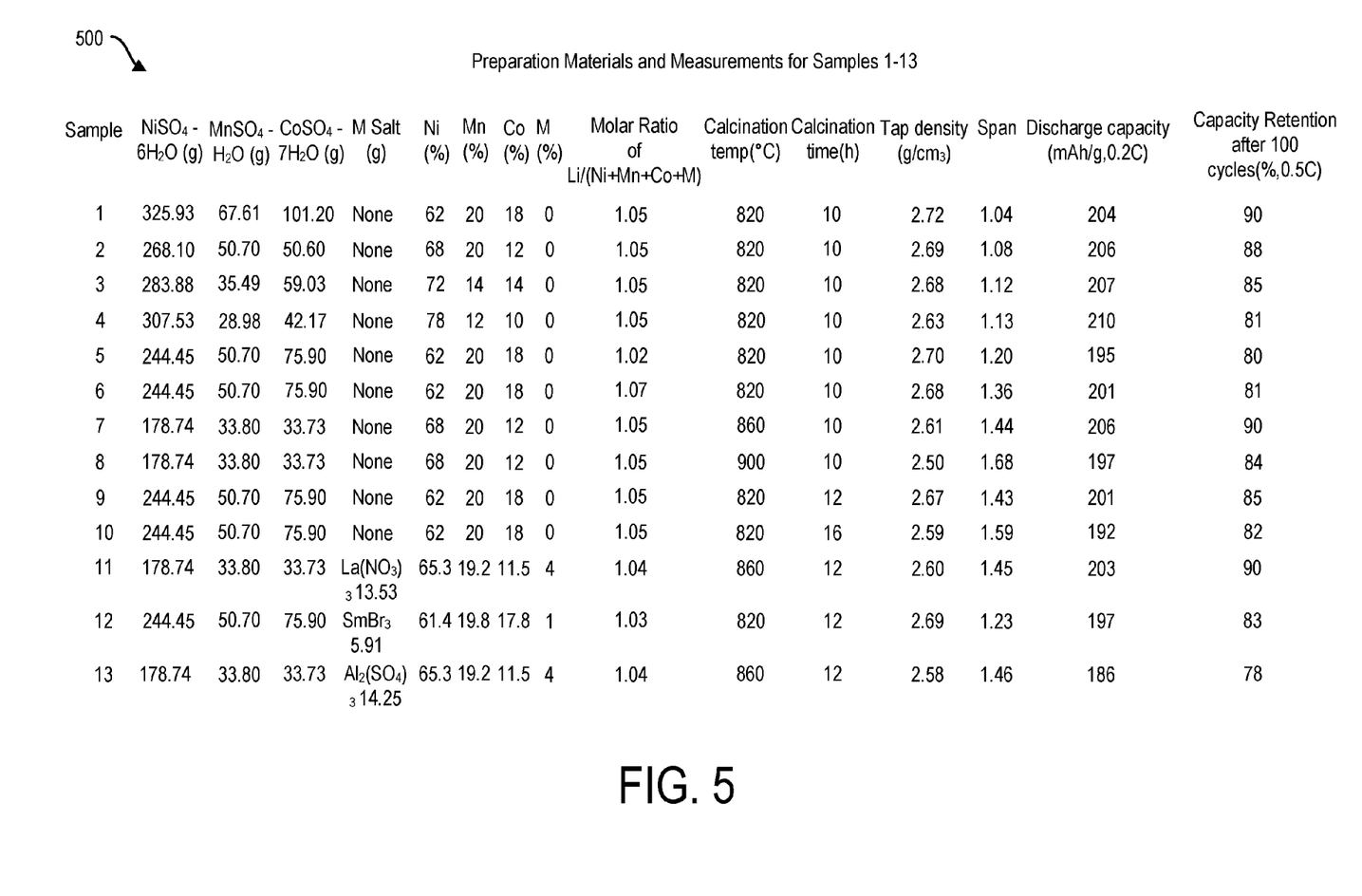
FIG. 5 shows a table listing details about preparation materials and measurements for samples of positive electroactive materials consistent with implementations of the current subject matter

The precipitate was filtered and washed to remove residual ions such as $Na^+$ and $SO_4^{2-}$. The precipitate was then dried in a vacuum oven at 110° C. for 20 hours to obtain a metal complex hydroxide precursor composed of a solid solution of nickel, manganese, cobalt and M having the composition ratio of Ni:Mn:Co:M listed in the Table 500 for each of Samples 1-13. The metal complex hydroxide precursor was then mixed thoroughly in a mixing machine with the amount of LiOH required to obtain the molar ratio listed in the Table 500. Finally, the mixture was calcined in oxygen at the temperature and for the amount of time listed in the Table 500 for each sample to produce the positive electroactive material.

The Table 500 lists the amounts in grams of $NiSO_4.6H_2O$, $MnSO_4.H_2O$, $CoSO_4.7H_2O$ and M salt used to prepare Samples 1-13 the percentages of nickel, manganese, cobalt, M and the molar ratio of Li/(Ni+Mn+Co+M) in the resulting positive electroactive materials, the calcination temperature (in ° C.) and times (in hours used to prepare Samples 1-13 and the tap density (g/cm$_3$), Span, discharge capacity (mAh/g, 0.2 C), and capacity retention after 100 cycles (%, 0.5 C) for each of Samples 1-13.

Various analyses were performed on one or more of the samples summarized in the Table 500. The following explanations and descriptions relate to various of these analyses, which are not intended to be limiting except to the extent that they are referenced in the claims of this application.

X-Ray Diffraction Pattern Data. A powder x-ray diffraction pattern of Sample 1 prepared as described above and in the Table 500 was collected using an X-ray diffractometer equipped with a copper target X-ray tube and a diffracted beam monochromator. Data were collected between scattering angles of 10 degrees and 85 degrees. A plot 100 showing powder x-ray diffraction pattern for the electroactive material of Sample 1 appears in FIG. 1.

Figure 6:
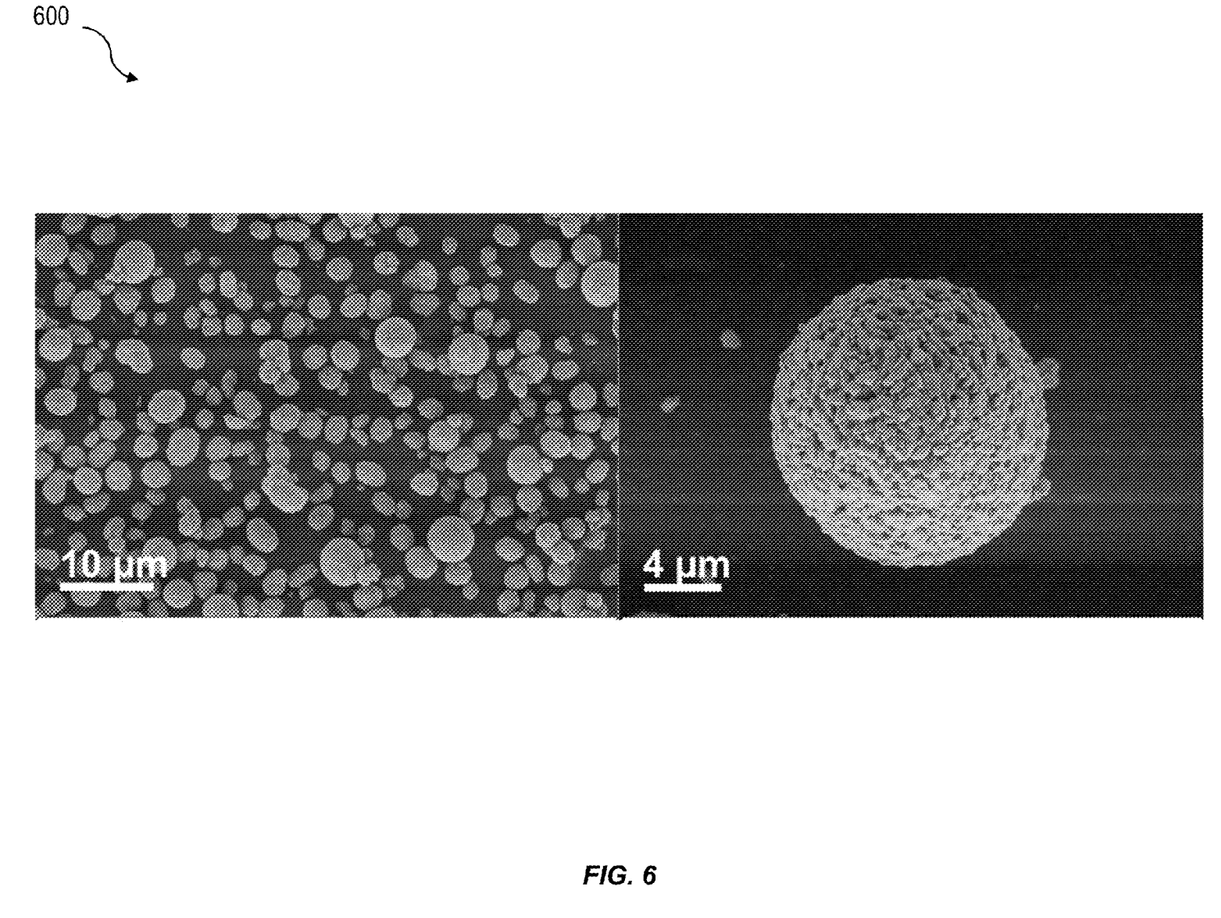
FIG. 6 shows scanning electron microscope (SEM) images of a positive electroactive material consistent with implementations of the current subject matter.

Field Emission Scanning Electron Microscopy Images. LEO 1550 Field Emission Scanning Electron Microscopy (FESEM) images were taken of the Sample 1 electroactive material prepared as described above and in the Table 500 to illustrate the morphology of the positive electroactive material. Example SEM images 600 are shown in FIG. 6. These images 600 indicate that the positive electroactive material has a well-defined spherical particle structure.

Tap Density Measurements. The tap density of the positive electroactive materials of Samples 1-13 prepared as described above and in the Table 500 was measured using a tap density analyzer. About 10 to 20 g of each positive electroactive material was weighed at an accuracy within 0.0001 g. Each Sample was placed in a graduated cylinder, which was then secured in a holder. For each Sample, 3000 taps (i.e., an automated lifting and dropping of the cylinder) were repeated on the Sample, after which the corresponding volume was measured. The tap density is equal to the Sample's mass/volume after the taps. Three parallel experiments were performed, with the results listed in the Table 500 representing the mean of the three experiments.

Particle Size and Particle Size Distribution. The Span (D90–D10)/D50 of each of Samples 1-13 prepared as described above and in the Table 500 was measured using a Bettersize BT-9300ST Laser Particle Size Analyzer. The equipment parameters and sample information were set, and a suitable amount of sample was added to the disperse pool for testing. After the test was completed, the Span for each sample was calculated using the equation (D90–D10)/D50. The characteristic particle size is D50. The Table 500 lists the Span for Samples 1-13. The data shows that the positive electroactive materials are uniform with relatively narrow size distribution.

Electrochemical Cells Constructed Using Sample Materials. Electrochemical cells were constructed as follows using the positive electroactive materials of Samples 1-13 prepared as described above and in the Table 500 as the cathode. The cathode was prepared as follows: (i) mixing ~3 wt % polyvinylidene fluoride (PVDF) binder in N-methyl-2-pyrrolidone (NMP) to form an NMP-binder mixture; (ii) mixing the NMP-binder mixture with the positive electroactive material and carbon black to form a mixture containing 80 wt % positive electroactive material, 10 wt % carbon black and 10 wt % NMP-binder mixture ("the 80:10:10 mixture"); (iii) transferring the 80:10:10 mixture into a ball mill, and milling the mixture at 800 rpm for 30 min with ten 5 mm diameter zirconia balls to form a slurry, wherein the zirconia balls function as a medium for more effective mixing; (iv) preparing a current collector by spreading aluminum foil onto a glass plate and spraying acetone to ensure that there are no air bubbles between the foil and the glass plate; (v) applying the slurry onto the aluminum foil, spreading uniformly on to the foil using a razor blade to form a coating film; and (vi) drying the coating in a vacuum at 110° C. for 12 hours to form the positive electroactive material.

A first set of twelve (12) lithium ion electrochemical cells were then prepared by combining a lithium intercalation negative electroactive material, a carbonate non-aqueous electrolyte, a separator and the positive electroactive material of each of Samples 1-13.

Figure 7:
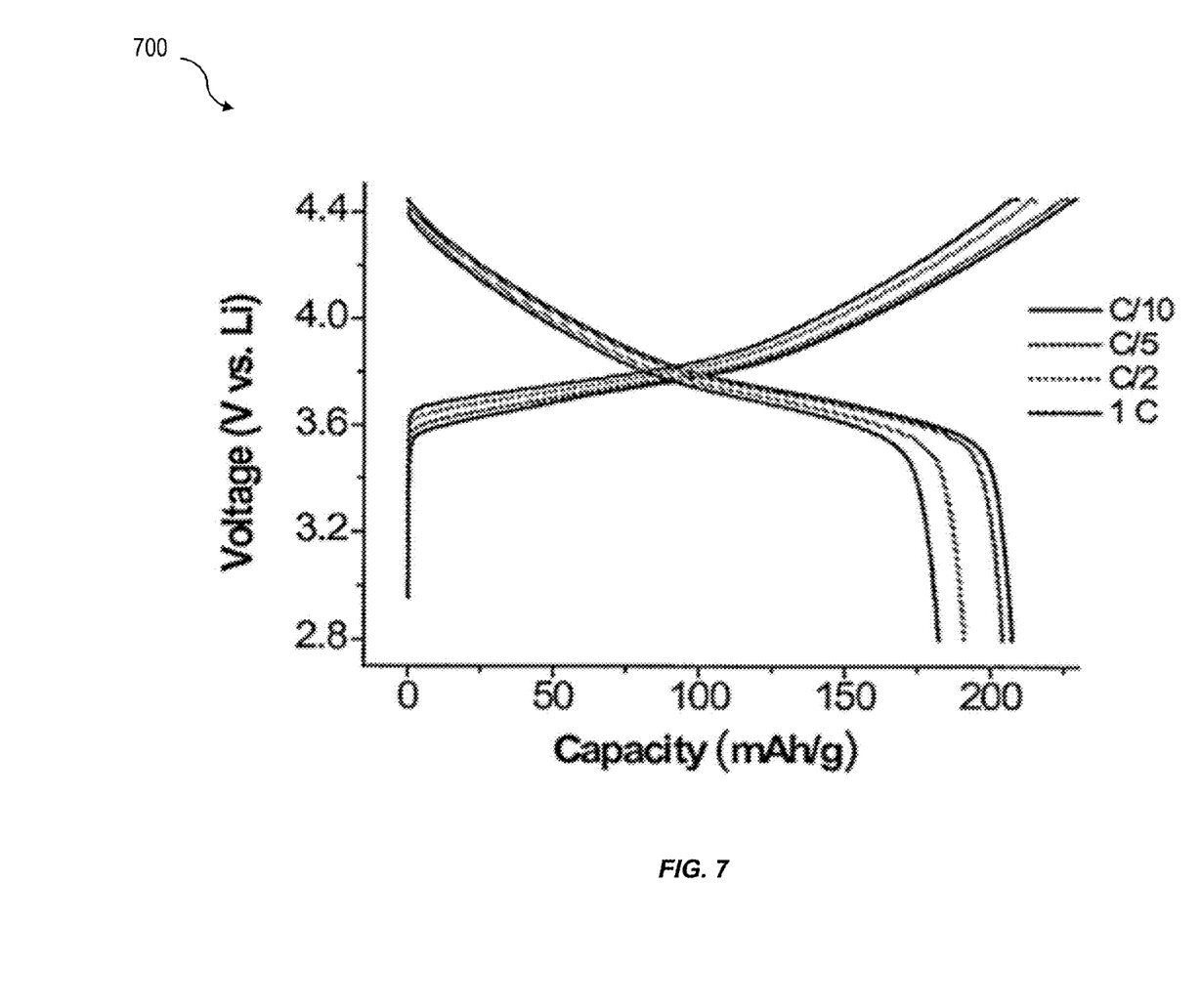
FIG. 7 shows a plot of voltage versus capacity for a positive electroactive material consistent with implementations of the current subject matter.

Each cell was then charged and discharged between 4.45 V and 2.8 V at room temperature using a BT-2000 Arbin battery test station with different current rates (1/10 C, 1/5 C, 1/2 C, and 1 C current rate, respectively). FIG. 7 shows a plot 700 of the voltage versus capacity for the electrochemical cell prepared with the positive electroactive material of Sample 1. The Table 500 lists the discharge capacity (mAh/g, 1/5 C) for each of the electrochemical cells prepared with Samples 1-13

Figure 8:
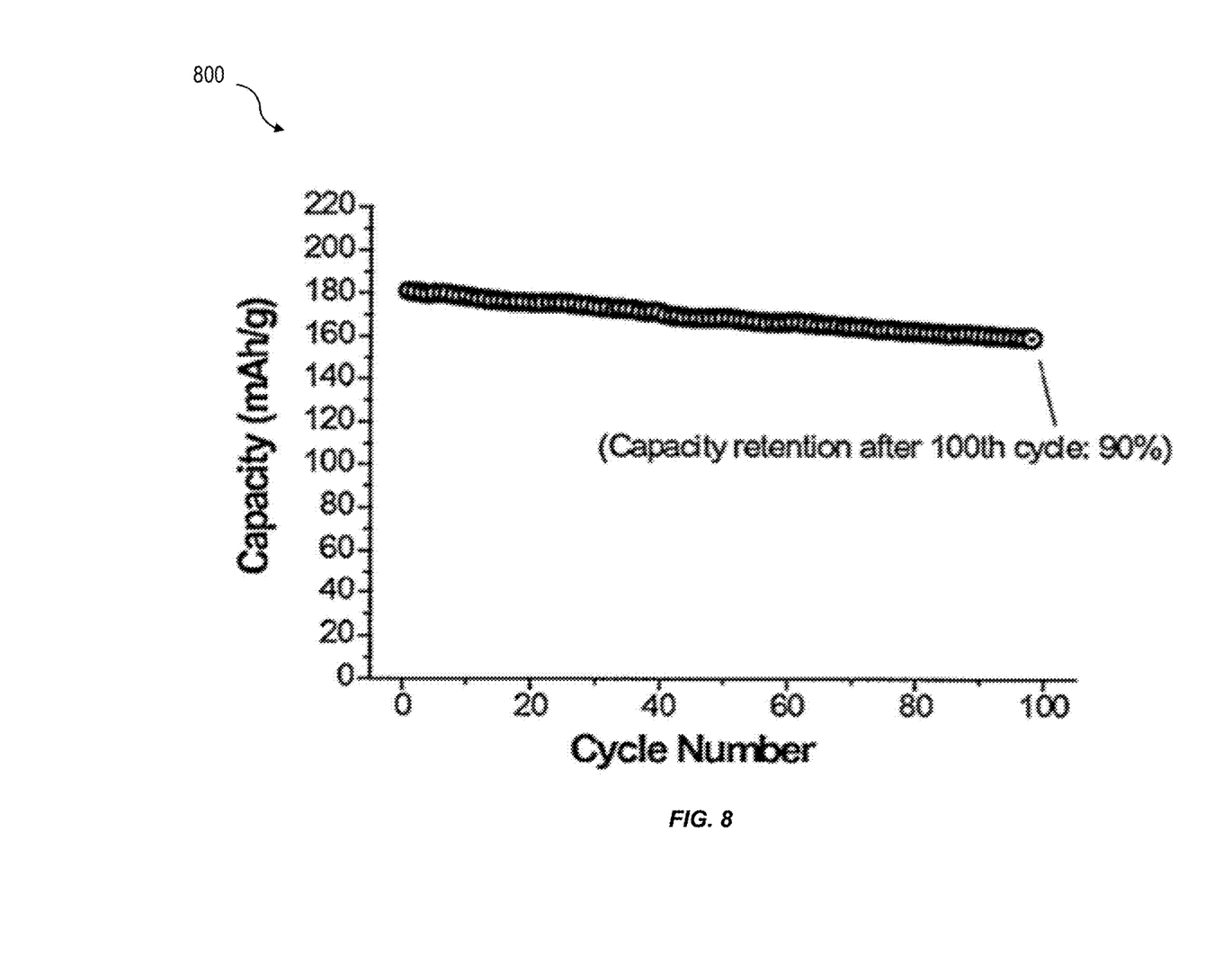
FIG. 8 shows a plot of capacity versus cycle number between 4.45 V and 2.8 V for a positive electroactive material consistent with implementations of the current subject matter; and When practical, similar reference numbers denote similar structures, features, or elements.

A second set of electrochemical cells was constructed using the material of Samples 1-13 and cycled by charging and discharging between 4.45 V and 2.8 V at room temperature using a BT-2000 Arbin battery test station with different current rates (1/10 C, 1/5 C, 1/2 C, and 1 C current rate, respectively). Each cell was charged and discharged between 4.45 V and 2.8 V at room temperature using Arbin battery test station with 1/2 C current rates. FIG. 8 shows a plot 800 of capacity versus cycle number for this material. The Table 500 list the capacity retention after 100 cycles (%, 0.5 C current rate) for each of the electrochemical cells prepared with Samples 1-13.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A positive electroactive material having a formula $Li_a[Ni_xMn_yCo_{1-x-y}]_zM_{1-z}O_2$, wherein:
   M is selected from Samarium (Sm), Silicon (Si), Lanthanum (La) or a combination thereof;
   a is a numerical value in a first range between approximately 1.02 and 1.07, x is a numerical value in a second range between approximately 0.60 to 0.82, y is a numerical value in a third range between approximately 0.09 to 0.20, z is a numerical value in a fourth range between approximately 0.95 to 1.0, and 1−x−y is greater than 0,
   the positive electroactive material has a tap density in a tap density range of approximately 2.50 to 2.90 g/cm$^3$,
   the positive electroactive material is formed into a plurality of closely packed particles, wherein the plurality of closely packed particles has a particle size distribution having a Span in a Span range of from about 1.04 to about 1.68, and
   the positive electroactive material has a layered structure.

2. The positive electroactive material of claim 1, wherein the plurality of closely packed particles comprises particles with a particle diameter range between approximately 10 and 14 μm.

3. The positive electroactive material of claim 1, wherein the positive electroactive material has a charge capacity ranging from about 192 to about 210 mAh/g using a discharging current of C/5 current rate.

4. The positive electroactive material of claim 1, wherein the first range is approximately 1.04 to 1.05.

5. The positive electroactive material of claim 3, wherein x is 0.62, y is 0.20, 1−x−y is 0.18, z is 1.0, the tap density range is approximately 2.59 to 2.72 g/cm$^3$, the Span range is approximately 1.04 to 1.59, and the capacity ranges from 192 to 204 mAh/g using a discharging current of C/5 current rate.

6. The positive electroactive material of claim 3, wherein a is 1.05, x is 0.68, y is 0.20, z is 1.0, 1−x−y is 0.12, the tap density range is approximately 2.50 to 2.69 g/cm$^3$, the Span range is approximately 1.08 to 1.68, and the capacity range is approximately 197 to 206 mAh/g using the discharging current of C/5 current rate.

7. The positive electroactive material of claim 3, wherein a is 1.05, x is 0.72, y is 0.14, z is 1.0, 1−x−y is 0.14, the tap density is 2.68 g/cm$^3$, the Span is 1.12, and the capacity is 207 mAh/g using the discharging current of C/5 current rate.

8. The positive electroactive material of claim 3, wherein a is 1.05, x is 0.78, y is 0.12, z is 1.0, 1−x−y is 0.10, the tap density is 2.63 g/cm$^3$, the Span is 1.13, and the capacity is 210 mAh/g using the discharging current of C/5 current rate.

9. A lithium ion electrochemical cell, comprising:
   a lithium intercalation negative electroactive material;
   a suitable non-aqueous electrolyte and a separator; and
   the positive electroactive material of claim 1.

10. A battery comprising one or more lithium ion electrochemical cells, wherein each lithium ion electrochemical cell comprises:
    a lithium intercalation negative electroactive material;
    a suitable non-aqueous electrolyte and a separator; and
    the positive electroactive material of claim 1.

11. A positive electroactive material having a formula $Li_a[Ni_xMn_yCo_{1-x-y}]_zM_{1-z}O_2$, wherein:
    a is a numerical value in a first range between approximately 1.02 and 1.07, x is a numerical value in a second range between approximately 0.60 to 0.82, y is a numerical value in a third range between approximately 0.09 to 0.20, z is a numerical value in a fourth range between approximately 0.95 to 1.0, and 1−x−y is greater than 0,
    the positive electroactive material is formed into a plurality of closely packed particles, wherein the plurality of closely packed particles has a particle size distribution having a Span in a Span range of from about 1.04 to about 1.68, and
    the positive electroactive material has a layered structure.

12. The positive electroactive material of claim 11, wherein the plurality of closely packed particles comprises particles with a particle diameter range between approximately 10 and 14 μm.

13. The positive electroactive material of claim 11, wherein the positive electroactive material has a charge capacity ranging from about 192 to about 210 mAh/g using a discharging current of C/5 current rate.

14. The positive electroactive material of claim 11, wherein the first range is approximately 1.04 to 1.05.

15. The positive electroactive material of claim 13, wherein x is 0.62, y is 0.20, 1−x−y is 0.18, z is 1.0, the tap density range is approximately 2.59 to 2.72 g/cm$^3$, the Span range is approximately 1.04 to 1.59, and the capacity ranges from 192 to 204 mAh/g using a discharging current of C/5 current rate.

16. The positive electroactive material of claim 13, wherein a is 1.05, x is 0.68, y is 0.20, z is 1.0, 1−x−y is 0.12, the tap density range is approximately 2.50 to 2.69 g/cm$^3$, the Span range is approximately 1.08 to 1.68, and the capacity range is approximately 197 to 206 mAh/g using the discharging current of C/5 current rate.

17. The positive electroactive material of claim 13, wherein a is 1.05, x is 0.72, y is 0.14, z is 1.0, 1−x−y is 0.14, the tap density is 2.68 g/cm$^3$, the Span is 1.12, and the capacity is 207 mAh/g using the discharging current of C/5 current rate.

18. The positive electroactive material of claim 13, wherein a is 1.05, x is 0.78, y is 0.12, z is 1.0, 1−x−y is 0.10, the tap density is 2.63 g/cm$^3$, the Span is 1.13, and the capacity is 210 mAh/g using the discharging current of C/5 current rate.

19. A lithium ion electrochemical cell, comprising:
    a lithium intercalation negative electroactive material;
    a suitable non-aqueous electrolyte and a separator; and
    the positive electroactive material of claim 11.

20. A battery comprising one or more lithium ion electrochemical cells, wherein each lithium ion electrochemical cell comprises:
    a lithium intercalation negative electroactive material;
    a suitable non-aqueous electrolyte and a separator; and
    the positive electroactive material of claim 11.

* * * * *